United States Patent [19]

Smith

[11] Patent Number: 4,953,811
[45] Date of Patent: Sep. 4, 1990

[54] SELF-DRIVING HELICOPTER TAIL ROTOR

[75] Inventor: Bert J. Smith, Gloucester Point, Va.

[73] Assignee: The United States of America as Represented by the Secretary of the Army, Alexandria, Va.

[21] Appl. No.: 260,209

[22] Filed: Oct. 19, 1988

[51] Int. Cl.$^5$ .............................................. B64C 27/82
[52] U.S. Cl. .............................. 244/17.19; 417/356; 417/420
[58] Field of Search ............... 244/17.11, 17.19, 17.21, 244/60; 416/170; 417/356, 420, 423.1, 423.7, 410; 440/6; 310/61, 62, 63

[56] References Cited

U.S. PATENT DOCUMENTS

| | | | |
|---|---|---|---|
| 1,761,444 | 6/1930 | Jones | 244/172.1 |
| 2,118,589 | 5/1938 | Carpenter, Jr. | 417/410 |
| 2,473,329 | 6/1949 | Candler | 244/17.21 |
| 3,353,028 | 11/1967 | Braikevitch et al. | 417/356 |
| 3,506,219 | 4/1970 | Mouille et al. | 244/17.21 |
| 3,708,251 | 1/1973 | Pierro | 440/6 |
| 3,914,629 | 10/1975 | Gardiner | 440/6 |
| 4,459,087 | 7/1984 | Barge | 417/356 |

Primary Examiner—Galen Barefoot
Attorney, Agent, or Firm—Norman L. Wilson, Jr.

[57] ABSTRACT

In order to compensate for the torque component generated by the main rotor of a helicopter, the helicopter engine turns a tail rotor while it is turning the main rotor. Tail rotors, while essential components, take power from the engine, introduce a drag force, add weight, and increase rotor noise. Since the engine is as close as possible to the main rotor, the complexity, number of parts, weight and efficiency of the remote tail rotor have gone unchanged. By this invention, those parts, and hence their added weights, have been eliminated. A self-driving tail rotor for a helicopter is provided herein.

3 Claims, 1 Drawing Sheet

SELF-DRIVING HELICOPTER TAIL ROTOR

BACKGROUND OF THE INVENTION

This invention, in general, relates to helicopters. In a more specific aspect the invention pertains to helicopter rail rotors.

It is known that in order to compensate for the torque component generated by the main rotor of a helicopter, the helicopter engine turns a tail rotor while it is turning the main rotor.

Tail rotors, while essential components, are nevertheless disadvantageous. They take power from the engine, introduce a drag force which must be overcome by the main rotor, add the weight of a power take-off, gear box, and a tail rotor drive shaft, and increase rotor noise. Apart from the reduction in size achievable by the fenestron tail rotor, the disadvantages of tail rotors remain. The weight and maintenance problems associated with a tail rotor drive mechanism have not been overcome. In addition to parasitic power consumption, there are usually over one thousand parts in a typical tail rotor gear train. Since the engine is as close as possible to the main rotor, the complexity, number of parts, weight and efficiency of the remote tail rotor have gone unchanged. By the practice of this invention, those parts, and hence their added weights, have been eliminated. And even more important, the tail rotor of this invention does not derive its power from the helicopter engine.

SUMMARY OF THE INVENTION

As pointed out hereinbefore, the tail rotor gear train has been eliminated by this invention. The reason a gear train is not required is that a self driving tail rotor for a helicopter is provided herein. As in conventional tail rotors, the rotor of the invention has a plurality of rotor blades connected at their root ends to a shaft. It also includes tail rotor bearing means, and retaining means securing the tail rotor shaft in the bearing means so that the tail rotor freely rotates. Here the resemblance ends. In the tail motor herein permanent magnets are affixed to the tips of the rotor blades, and primary windings are mounted within a housing. The permanent magnets generate revolving magnetic flux fields. When electrical means energize the primary windings, a traveling-wave field is produced. This traveling-wave field coacts with the magnetic flux to form a high reluctance flux path. Saliency thus produced coverts the tail rotor into a reluctance motor.

THE DRAWINGS

Previous attempts at electrically driven tail rotors have involved separate electric motors. However, because the tangential force available on an armature or such motors is limited by the strength of permanent magnets, it was necessary to have large heavy motors for direct drive rotors. Such an approach does not justify providing tail rotor drive means adjacent the rotor. How the result has been achieved herein can best be discerned from a description of the invention in conjunction with the accompanying drawings.

DETAILED DESCRIPTION OF THE DRAWING

Figure 1:
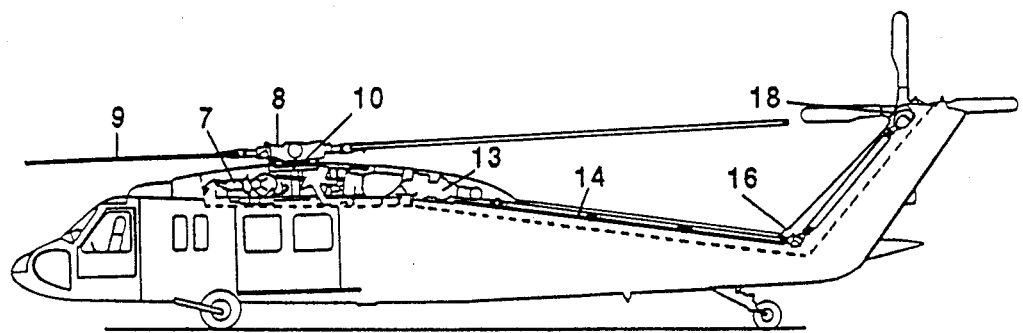
FIG. 1 is a diagrammatic view of a helicopter showing the conventional, complex, tail rotor drive.

As indicated hereinbefore the chief reason for improving a helicopter tail rotor is to eliminate the tail rotor drive train with its transmissions, gear boxes, and drive shafts. An idea of the magnitude of the tail rotor drive mechanism can be obtained by referring to the cutaway view illustrated in FIG. 1. A helicopter is shown, along with its avionics equipment 4, fuel system 6, power generator 7 and main rotor head 8. Main rotor blade 9, tail rotor 11 and gas turbine engine 13 are also visible. Within main transmission 10 is tail rotor gear box 12, and a drive shaft 14 which includes hundreds of parts. It is made up of a series of sections, shaft assemblies a, b, c, d, and f, joined by hanger assemblies g, h, i, and j, each having internal parts. The drive train also includes intermediate gear box 16 and tail gear box 18. It can readily be seen that the elimination of a tail rotor drive train will not only reduce the parts count, weight and complexity of the tail rotor mechanism, but it will reduce maintenance as well.

Figure 2:
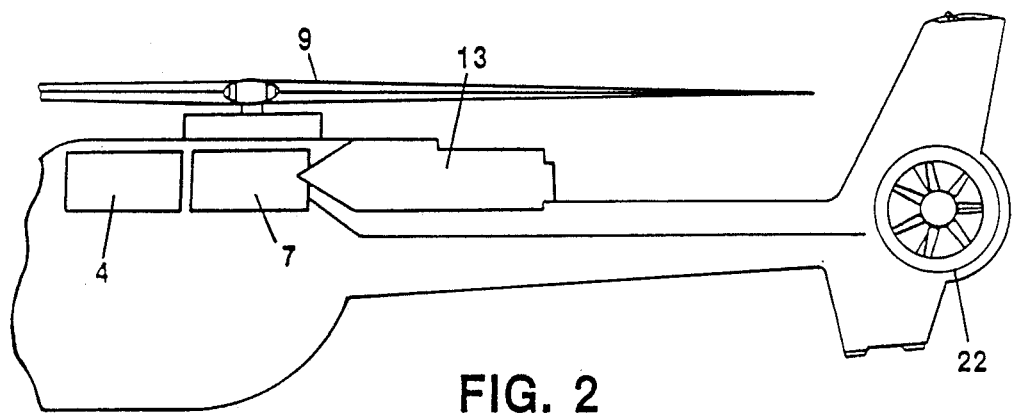
FIG. 2 is a line drawing partially block diagram form showing the tail rotor of the invention.

The tail rotor of this invention is shown in FIG. 2. It will be apparent that because of the presence of weather guard or housing 20 this tail rotor 22 resembles a fenestron. However, whereas some of the performance benefits of a fenestron are obtained herein, the tail rotor drive mechanism of this invention is markedly different. Before describing this drive mechanism a discussion of reluctance motors may be helpful.

All electric motors are characterized by the interaction of electromagnetic circuits. This interaction may be accomplished in either of two ways: (1) by energizing directly both the stationary and rotating members (referred to as stator and rotor) from a power source or (2) by energizing only one member directly, usually the stator, and permitting the other, the rotor, to receive its energy inductively. In an induction motor an arrangement of stator windings, when properly excited from an a-c source, gives rise to a set of magnetic poles that revolve in space at a definite speed—the so-called synchronous speed —to induce voltages and currents in a set of rotor windings. This process, generally referred to as transformer action, is thus responsible for the electric power that is delivered to the rotor inductively to develop mechanical power. An induction motor, in effect, is a rotating transformer, i.e., one in which two windings are coupled magnetically, with one of them, mounted on a stationary magnetic core, connected to an a-c source, while the other is placed on a magnetic structure that is free to turn. It should be understood that there is absolutely no physical connection between the rotor and the electric source. The rotor current and the resulting motor action are completely electromagnetic. Revolving magnetic fields can be developed in several ways, but basically all methods depend upon the principle that two or more windings that are displaced physically in space must be excited by currents that are displaced in time.

Herein we are concerned with an inductor machine rather than an induction machine. Unlike induction machines which involve relative motion between a revolving field and a stationary field, inductor machines utilize the pulsation of a flux imposed by cyclic variation of the reluctance of a magnetic circuit. In other words, the flux density or permeance varies or pulsates between a maximum and a minimum and this flux variation induces a voltage. The essence of inductor machines is that there is only one field winding. If, instead of inducing a voltage, the machine is a motor it is a reluctance motor. Reluctance motors have primary windings producing a traveling-wave field. The rotors are basically induction rotors, modified to produce saliency. The operation of the motor depends on the locking of the rotor saliency with the traveling poles of the primary. The basic requirement of the rotor thus is to produce saliency, a maximum difference in gap reluctance between the d-axis of the saliency and the g-axis in electrical quadrature therewith.

Figure 3:
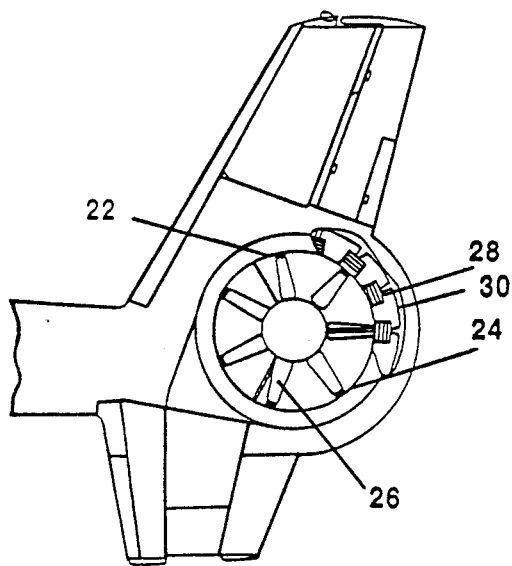
FIGS. 3 and 4 are cut-away and cross-sectional views illustrating the internal workings of this invention.
Figure 4:
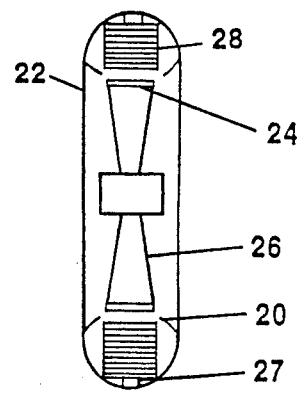

Essentially the tail rotor contemplated herein, shown in FIG. 3, is a reluctance motor. Instead of a motor driven tail rotor, the rotor itself is the motor. Permanent magnets 24 are mounted on the tips of the tail rotor blades 26. These magnets can be secured to the blade tips with rivits, a suitable adhesive, or they can be encapsulated to form the blade. The tail rotor rotates inside a circumferential shroud or housing 20, best seen, as indicated hereinbefore, in FIG. 4. Using mounting brackets 27 field coils 28 are mounted inside housing 20. By commutation of field coils 28 synchronously with the blade rotation, the rotor is driven in synchronism with the moving wave of magnetomotive force created by the sequential commutation of the field coils. This action is identical to that of a brushless DC motor or a snychronous AC motor.

The direct current is supplied to field coils 28 by generator 7 (FIG. 2). Electronics 4 includes a solid-state power controller to communtate the field coils in sequence to produce the traveling wave field. This field co-acts with the flux from the blade magnets to form a high reluctance flux path. Saliency thus produced converts the tail rotor into a reluctance rotor-motor.

The coils supported in housing 20 by mounting brackets 27, are separated from each other by wiring 30. The coils are so disposed that their flux forms a properly oriented traveling wavefield to co-act with the flux from magnets 24.

As indicated herein before insofar as I have been able to determine any attempts at electric tail rotor drive means, resembling that shown in 4,702,437, have included separate motors. Because the tangential force available on the armature of such motors is limited by the strength of the permanent magnets, it has been necessary to have either high revolution per minute (rpm) small motors and reduction gearing, or large diameter, unwieldy, motors for such rotors. This invention, therefore, fulfills a long-felt need. In operation the rotor saliency coacts with the traveling poles of the field coils. The initial locking of rotor saliency acts as a damper to provide the a synchronous torque to start the motor and raise its speed to a value from which reluctance torque can provide synchronous pull-on.

With the understanding that design of reluctance motors is known in the art a specific example will now be given.

PREFERRED EMBODIMENT

The trend in helicopters is a move toward predominantly 270 volt DC electrical systems. Considering that a suitable reluctance tail-rotor motor will be a 400 Hz motor operating at 5000 rpm, those constants will be used in this example, along with the helicopter shown in FIG. 2.

The helicopter shown in FIG. 2 has a tail rotor 22 with nine rotor blades 26. Affixed to the tips of these blades are neodymium-iron-boron magnets 24 having the following magnetic characteristics:

| | | |
|---|---|---|
| Enerqy Product (B*H) max | 32.0 | MGOe |
| Intrinsic Energy Products (B₄Hₓ) max | 140.0 | MGOe |
| Residual Induction (B) | 11.75 | kGauss |
| Coercive Force ($H_c$) | 10.50 | kOersteds |
| Intrinsic Coercive Force ($H_a$) | 13.0 | kOersteds |
| Reversible Temp Coefficient | −0.157 | % °C. |
| Max Operating Temperature | 170.0 | °C. |
| Density | 7.5 | g/cm |

Spaced from the blade magnets 24 a distance required for an air gap density of 45,000 voltamps (VA) are field coils 28. At 5000 rpm and at a 400 Hz frequency level, the number of these poles required is derived algebraically from the equation:

$$\text{frequency (Hz)} = \frac{\text{(poles)} \times \text{motor rpm}}{120}$$

Calculating the number of poles from the above—poles=(Hz) (120)/(rpm)—we find that the motor herein will require ten (10) poles. Now, if a conventional helicopter oil-colled generator rated at 30/45 kVa is used to power the integrated reluctance motor, then, from the gap density and voltage given above the required load will be:

$$\text{load} = \frac{45000 \text{ VA}}{270 \text{ V}} = 375 \text{ amps}$$

The diameter swept out by the fan blades is approximately five feet-two inches.

For this ten pole machine, then, consider the following:

e (axis displacement)=0.001 m
D (diameter of core)=1.7 m
l (length of conductor)=.15 m
$l_g$ (gap spacing)=0.010 m
$A_1$ (stator current sheet density)=12800 A/m
$A_2$ (rotor current sheet density)=9600 A/m
λ (torque angle)=τ/3 rad From this data the force ($F_0$) can be calculated as follows:

$(F_0)^2 = F_1^2 + F_2^2 + 2F_1F_2\cos\lambda$
$F_1 = \frac{1}{2}A_1D = (.5)(12800)(1.7) = 10,880$ A -t
$F_2 = \frac{1}{2}A_2D = (.5)(9600)(1.7) = 8160$ A -t
$F_0 = \sqrt{(10,800)^2 + (8160)^2 + 2(10,880)(8160)\cos(60°)}$
$F_0 = 118374400 + 66585600 + 88780800$
$F_0 = 16545$ Ampere.turns From this force ($F_0$), permeability constant μ, and gap spacing ($l_g$) the magnetic flux $B_m$ can be derived.

$$B_m = \frac{F_o \mu_o}{l_g} = \text{magnetic flux density}$$
$$= \frac{(16545)(1.24 \times 10)}{0.005}$$
$$= 4.103 \text{ Telsa/pole}$$

Considering now the operation of the motor herein as a tail rotor, such operation involves means for controlling rotor (motor) speed. Rotor speed will be controlled through the motors' primary controller via the on-board flight computer and cockpit pedal commands. The electric tail rotor drive (ETRD) concept will take advantage of the trend from fly-by-wire controls to electronic flight controls which incorporate linear electric motor (LEM) actuators. Pedal control signals from the pilot/co-pilot will be electronically fed to the flight computer. From the flight computer the command signals will travel to the tail rotor motor primary controller where an inverter/converter unit (ICU) will process the electrical excitation to the field windings, thus controlling rpm. process the electrical excitation to the field windings, thus controlling rpm.

Having been given the teachings of this invention, ramifications and variations will occur to those skilled in the art. As an example, conductive loops of wire can be built into the blades, instead of the magnets. In this case the ends of the blades should be enlarged to provide a sufficiently large current path for the excitation. The action will then be similar to that of known induction or squirrel cage motors. Such an approach will require no position sensor. As another variation, the field coils can be embedded in the blades, with the magnets being mounted in the housing. These modifications however, are less desirable because they entail the use of slip rings and the like. In all of these ramifications, the large diameter of the tail rotor is used to produce the tangential velocity to drive the rotor, eliminating the need for a separate drive motor. The variations also result in a significant decrease in the weight and complexity of tail rotor drives. Such modifications are, therefore, deemed to be within the scope of this invention.

What is claimed is:

1. A tail rotor propulsion apparatus for a helicopter comprising a plurality of rotor blades connected at their root ends to a shaft to form a tail rotor, bearing means, retaining means securing the tail rotor shaft in the bearing means so that the tail rotor freely rotates, a circumferential housing surrounding the arc described by the rotating tail rotor blades, permanent magnets generating magnetic flux, means attaching the permanent magnets to the tip of each rotor blade, primary winding coils mounted within the circumferential housing so that their flux forms a properly oriented traveling-wave field to coact with the flux from the permanent magnets, means for commutating the field windings in sequence to produce in the primary windings a traveling-wave field, electrical means energizing the primary windings so that the traveling-wave field forms a high reluctance flux path which coacts with the magnetic flux of the permanent magnets in the rotor blade tips, saliency thus produced, converting the rotor into both a reluctance motor and a self-driving tail rotor as a result of the pulsation of flux imposed by cyclic variation in the reluctance of a magnetic circuit.

2. The tail rotor propulsion apparatus of claim 1 including means controlling the speed of said reluctance motor.

3. A helicopter including the tail rotor propulsion apparatus of claim 2.

* * * * *